(No Model.)

E. C. PHILLIPS.
WASTE PLUG.

No. 601,400. Patented Mar. 29, 1898.

Witnesses: Inventor.
E. G. Acker. Elwood C. Phillips
J. D. Noble. By B. Inger
Att'y.

UNITED STATES PATENT OFFICE.

ELWOOD C. PHILLIPS, OF CHICAGO, ILLINOIS, ASSIGNOR, BY DIRECT AND MESNE ASSIGNMENTS, TO HENRY BREYER AND HENRY BREYER, JR., OF SAME PLACE.

WASTE-PLUG.

SPECIFICATION forming part of Letters Patent No. 601,400, dated March 29, 1898.

Application filed July 1, 1897. Serial No. 643,151. (No model.)

*To all whom it may concern:*

Be it known that I, ELWOOD C. PHILLIPS, a citizen of the United States, residing at Chicago, county of Cook, and State of Illinois, have invented a new and useful Improvement in Waste-Plugs, of which the following is a specification.

My invention relates to that class of waste-plugs for use in washbasins, bath-tubs, and other purposes in which rubber washers are used in connection with a metal ring to stop the flow of water into the waste-pipe, and is fully described below, the object being to provide a plug that is reliable, cheaply constructed, durable, and parts easily replaced when worn.

My device is illustrated in the accompanying drawings, in which—

Figure 1:
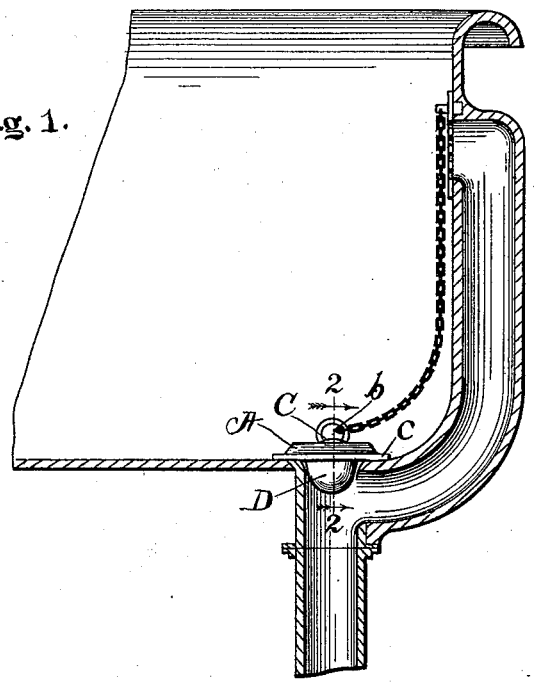
Figure 2:
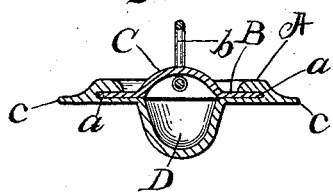
Figure 3:
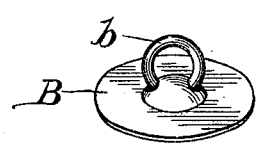
Figure 4:
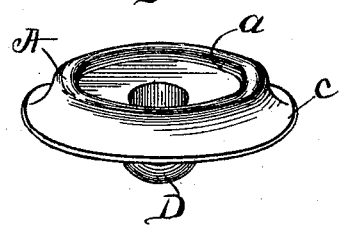

Figure 1 is a section of a bath-tub and waste-pipe, showing the plug inserted. Fig. 2 is a section on line 2 2, Fig. 1. Figs. 3 and 4 are perspective detailed views of the metal and rubber washer.

Similar letters refer to similar parts throughout the views.

A is the rubber diaphragm or washer.

B is the metallic plate, inserted in a groove in the diaphragm.

C is the convex center.

D is the rubber projection or nipple on the rubber diaphragm.

*a* is the groove in the rubber diaphragm.

*b* is the ring.

In the construction of the plug I use a soft-rubber diaphragm A, containing an annular recess and groove or channel to receive a thin circular metallic plate B, provided with a convex center C, in which are two perforations adapted to receive and hold open ring *b*. The diaphragm A also has a nipple D, projecting from the central portion of its under surface, which is hollow. The convex center C on the under surface is concave, which portion, sitting over the cavity of the nipple D, forms a receptacle for water, which causes the plug to be rigid in its position when inserted into the drain. The diaphragm is beveled on its outer circumference, the edges slightly flanged for the purpose of more perfectly covering the drain and fitting closely to it.

The rubber diaphragm when worn can be easily replaced on the metallic plate B. The metallic plate is made to extend as near the edge of the rubber diaphragm as possible to prevent the edges from curling up when the water is hot.

Having thus described my invention, what I claim as new, and desire to secure by Letters Patent, is—

1. In a waste-plug, the combination of a rubber diaphragm provided with a concavo-convex center, recessed on the upper surface and grooved therein to receive a thin metal circular plate or washer provided with a convexo-concave center, containing perforations to receive an open ring as and for the purpose specified.

2. In a water-plug the combination of a thin circular metal plate or washer provided with a convexo-concave center said center perforated to receive an open ring, a rubber diaphragm containing an annular recess, and groove, and provided with a concavo-convex center, and beveled on its outer circumference, the edges slightly flanged, as and for the purpose specified.

In testimony whereof I affix my signature in presence of two witnesses.

ELWOOD C. PHILLIPS.

Witnesses:
EDWARD L. FEANSTEED,
GEORG L. BOLTUM.